United States Patent
Feigenbaum et al.

(10) Patent No.: US 11,747,639 B2
(45) Date of Patent: Sep. 5, 2023

(54) BIREFRINGENT WAVEPLATE AND METHOD FOR FORMING A WAVEPLATE HAVING A BIREFRINGENT METASURFACE

(71) Applicant: Lawrence Livermore National Security, LLC, Livermore, CA (US)

(72) Inventors: Eyal Feigenbaum, Livermore, CA (US); Jeffrey D. Bude, Danville, CA (US); Jean-Michel Di Nicola, Livermore, CA (US); Hoang T. Nguyen, Livermore, CA (US); Christopher J. Stolz, Lathrop, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 503 days.

(21) Appl. No.: 16/518,500

(22) Filed: Jul. 22, 2019

(65) Prior Publication Data

US 2021/0026150 A1    Jan. 28, 2021

(51) Int. Cl.
*G02B 5/30* (2006.01)
*G02B 27/28* (2006.01)
*G02B 6/27* (2006.01)

(52) U.S. Cl.
CPC .......... *G02B 27/283* (2013.01); *G02B 5/3083* (2013.01); *G02B 6/272* (2013.01)

(58) Field of Classification Search
CPC .... G02B 27/28; G02B 27/283; G02B 27/286; G02B 5/3083; G02B 6/272; G02B 1/002; G02B 1/005; G02B 1/007; G02B 5/1809; G02B 5/1876; G02B 2207/101; B82Y 20/00
See application file for complete search history.

(56) References Cited

U.S. PATENT DOCUMENTS

| | | | | |
|---|---|---|---|---|
| 5,116,461 A | * | 5/1992 | Lebby | G02B 5/1857 204/192.34 |
| 5,212,593 A | * | 5/1993 | Williamson | G02B 13/14 359/485.07 |
| 10,690,821 B1 | * | 6/2020 | Evans | H01L 21/31105 |
| 2004/0013076 A1 | | 1/2004 | Funato et al. | |
| 2004/0095535 A1 | * | 5/2004 | Nakagawa | H04N 9/3105 349/117 |
| 2005/0264715 A1 | | 12/2005 | Kahen et al. | |

(Continued)

OTHER PUBLICATIONS

Yichuan Hu et al., "A simply method to measure the thickness and order number of a wave plate", European Journal of Physics 34, pp. 1167-1173, Jul. 2, 2013 (Year: 2013).*

(Continued)

*Primary Examiner* — Stephone B Allen
*Assistant Examiner* — Adam W Booher
(74) *Attorney, Agent, or Firm* — HARNESS, DICKEY & PIERCE, P.L.C.

(57) ABSTRACT

The present disclosure relates to a waveplate having a substrate forming an optic. The substrate may have an integral portion forming a plurality of angled columnar features on an exposed surface thereof. The plurality of angled columnar features may further be aligned parallel with a directional plane formed non-parallel to a reference plane, with the reference plane being normal to a surface of the substrate. The metasurface forms a birefringent metasurface.

22 Claims, 4 Drawing Sheets

(56) References Cited

U.S. PATENT DOCUMENTS

| | | | |
|---|---|---|---|
| 2006/0001969 A1 | 1/2006 | Wang et al. | |
| 2013/0286480 A1* | 10/2013 | Hirota | G02B 1/08 359/492.01 |
| 2016/0370608 A1 | 12/2016 | Takada et al. | |
| 2017/0017028 A1* | 1/2017 | Miller | G02B 27/286 |
| 2017/0149019 A1* | 5/2017 | Smith | H01L 31/03529 |
| 2017/0299881 A1* | 10/2017 | Rothschild | G02B 5/30 |
| 2018/0363148 A1 | 12/2018 | Feigenbaum | |
| 2019/0137075 A1 | 5/2019 | Aieta et al. | |
| 2019/0391298 A1 | 12/2019 | Yoo et al. | |
| 2020/0284964 A1* | 9/2020 | Sugawara | G02B 1/115 |

OTHER PUBLICATIONS

International Search Report and Written Opinion regarding International Application No. PCT/US2019/046527 dated Apr. 22, 2020.
K. R. Manes, et al. Damage Mechanisms Avoided or Managed for NIF Large Optics, Fusion Science and Technology 69, 146-249 (2016).
R. W. Boyd, et. al., Self-focusing: Past and Present (Springer, 2009).
S. N. Vlasov, et. al. Use of circularly polarized optical beams to suppress self-focusing instability in a nonlinear cubic medium with repeaters, Sov. J. Quantum. Electron. 12(1), 7-10 (1982).
G.W. Mbise et al. Review Article: Angular selective window coatings: theory and experiments, J. Phys. D: Appl. Phys. 30, 2103 (1997).
I. Hodgkinson et al. Dispersion equations for vacuum-deposited tilted-columnar biaxial media, Appl. Opt. 40. 452-457 (2001).
B. Zhang et al. Thin-form birefringence quarter-wave plate for lower terahertz range based on silicon grating, Opt. Eng. 52(3), 030502 (2013).
M. Mutlu et al. Broadband circular polarizer based on high-contrast gratings, Opt. Lett. 37(11), 2094-2096 (2012).
A. C. Van Popta et al. Birefringence enhancement in annealed TIO2 thin films, J. Appl. Phys. 102, 013517 (2007).
D. A. Zeze et al. Reactive ion etching of quartz and Pyrex for microelectronic applications, J. Appl. Phys. 92, 3624 (2002).
Su Vin-Cent et al.: "Advances in optical metasurfaces: fabrication and applications [Invited]", Optics Express, vol. 26, No. 10, May 7, 2018, p. 13148.
Grineviciute Lina et al.: "Optical anisotropic coatings for polarization control in high-power lasers", SPIE Proceedings; [Proceedings of SPIE ISSN 0277-786X], SPIE, US, vol. 11033, Apr. 26, 2019, pp. 110330O-110330O.
Hou-Tong Chen et al.: "A review of metasurfaces: physics and applications", Arxiv.org, Cornell University Library, 201 Olin Library Cornell University Ithaca, NY 14853, May 25, 2016.
Extended European Search Report in corresponding European Patent Application No. 19938722.6 dated Sep. 8, 2022, 9 pages.

* cited by examiner

BIREFRINGENT WAVEPLATE AND METHOD FOR FORMING A WAVEPLATE HAVING A BIREFRINGENT METASURFACE

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to birefringent structures, and more particularly to a system and method for forming a birefringent metasurface in a substrate material.

BACKGROUND

The statements in this section merely provide background information related to the present disclosure and may not constitute prior art.

Major limiters of laser systems peak power and energy are laser-induced damage processes. One of these processes is the formation of filamentation bulk damage.

It has been shown that propagating the light from a laser with an elliptical/circular polarization increases the permissible intensities with respect to linear polarization, which results from a reduced effective Kerr coefficient. The reduction in the effective Kerr coefficient from linear to circular polarization is 50% (both from theoretical and experimental demonstrations), and thus also within permissible intensities.

Designing the laser system chain for a linearly polarized light beam, however, is simpler. For example, amplifiers are designed at the Brewster incidence angle. Mirrors and frequency converters are of simpler design as well, usually at one linear polarization. Therefore, the desirable solution is for the light to propagate at a linear polarization through most of the system and to be converted to a circular polarization only at the sections of lowest laser damage threshold, which are usually found at the final optics assembly, and in the ultraviolet (UV) spectrum.

The optical component that converts linear to elliptical polarization is a wave retardation plate, which is typically referred to as a "waveplate". The waveplate introduces a delay between the two linear polarization components. Specifically, to convert between linear and circular polarizations, the required delay between the two linear polarization components is $\lambda/4$ (quarter of a wavelength), and thus the waveplate construction that achieves this conversion is referred to as a quarter wave plate or "QWP".

Traditional waveplate implementations include crystalline (spatially homogeneous) birefringent materials. Birefringent materials have different propagation indices/speeds at two principal axes. Other, more recent solutions include glancing angle deposition ("GLAD") of columnar nano-structure, which is not necessarily made of birefringent material. However, the GLAD columnar nano-structure produces asymmetry between the two polarizations which results in the sub-wavelength structure (i.e., also known as a "meta-surface") making the effective material of the surface layer anisotropic.

Since the main optical components of the laser system are made of low interaction cross-section with light (by design), deposition of a new material usually results in reduced laser damage threshold, which defies the purpose of adding the waveplate. This has been a major limitation so far for using QWP made of birefringent materials, or for using same glass material (or other oxides) in a columnar structure metasurface implementations (e.g., GLAD), which usually has more traps/dislocation for light interaction with material. An additional drawback of the GLAD methodology is that it produces scatter, which has a negative impact on performance, especially critical for energetic lasers (i.e., because of the loss of power, and stray/scattered light that might cause further damage).

From experience, it is generally understood that when it comes to maintaining or increasing the laser induced damage threshold (LIDT), a subtractive process via etching of optical grade optics results in a higher LIDT. Structuring the surface of the optic by etching a sub-wavelength periodic grating will also result in a birefringence. For a prototypical case of a high power laser system, the incidence wavelength is 351 nm in fused silica glass. Thus, to avoid diffracting higher orders, the grating period has to be at least smaller than twice the wavelength. However, obtaining such a grating over large apertures with present day lithography technology is extremely challenging.

SUMMARY

This section provides a general summary of the disclosure, and is not a comprehensive disclosure of its full scope or all of its features.

In one aspect the present disclosure relates to a waveplate which may include a substrate forming an optic, with the substrate including an integral portion forming a plurality of angled columnar features on an exposed surface thereof. The plurality of angled columnar features may further be aligned parallel with a directional plane formed non-parallel to a reference plane, the reference plane being normal to a surface of the substrate. The metasurface may form a birefringent metasurface.

In another aspect the present disclosure relates to a waveplate for receiving an optical signal. The waveplate may comprise a substrate forming an optic, with the substrate including an integral portion forming a metasurface formed on an exposed surface thereof, and extending partially into the substrate. The metasurface including a plurality of angled, columnar features formed using a portion of the substrate, the angled columnar features being in a generally uniform grid-like pattern and each having a length of between $1.5\lambda$-$4\lambda$ of a wavelength of the optical signal passing through the waveplate. The plurality of angled, columnar features further being aligned parallel with a directional plane defined by an angle $\theta$, where $\theta$ is between 40°-75° relative to a reference plane, the reference plane being normal to a surface of the substrate. The metasurface forms a birefringent metasurface.

In another aspect the present disclosure relates to a method for forming a birefringent waveplate. The method may comprise providing a substrate, creating a mask on an outer surface of the substrate, and using a material removal process, together with the mask, to remove select material portions from the substrate. The material removal process forms a plurality of angled, columnar features which collectively form a birefringent metasurface using a portion of the substrate. The birefringent metasurface forms an integral portion of the substrate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, wherein:

FIG. 1b is a cross-sectional view taken in accordance with section line 1b-1b in FIG. 1 to show the orientations of the angled columnar projections from a perspective 90 degrees shifted from that of FIG. 1a;

DETAILED DESCRIPTION

Example embodiments will now be described more fully with reference to the accompanying drawings.

The present disclosure involves a method and system that enables implementing waveplates to withstand energetic laser beams by directional etching through a nano-particles etch mask at a high incidence angle to obtain a tilted, columnar, birefringent meta-surface formed on the optical substrate.

Figure 1:
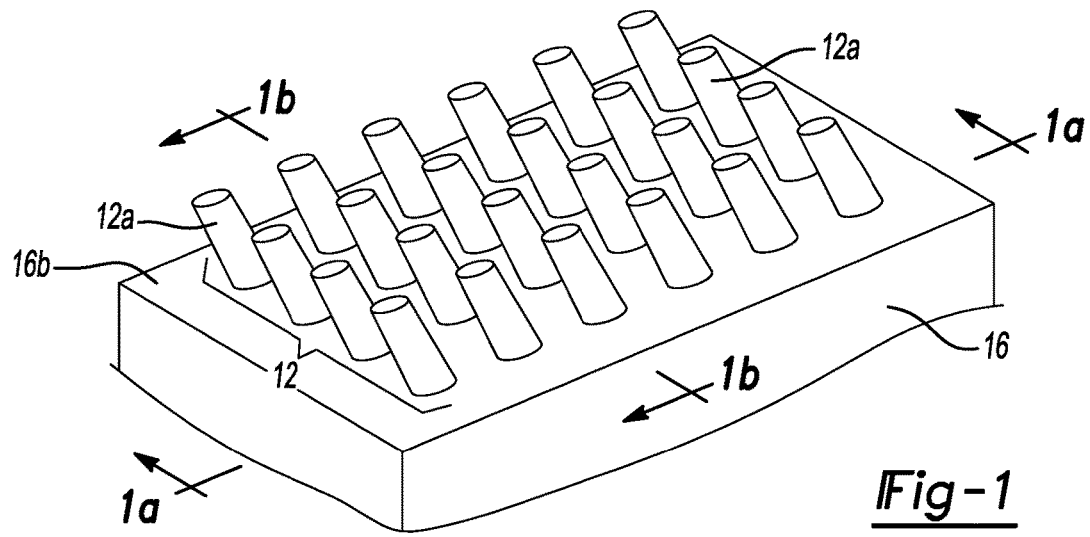
FIG. 1 is a simplified perspective view of a portion of a birefringent waveplate in accordance with one embodiment of the present disclosure, which illustrates a plurality of columnar projections projecting from one surface of a substrate material of the waveplate.

Referring to FIG. 1, one embodiment of a waveplate 10 in accordance with the present disclosure is shown. In this embodiment the waveplate 10 includes a generally uniform pattern of tilted or angled columnar features, which in this embodiment may be termed "columnar projections" 12a. The columnar projections 12a collectively form a birefringent metasurface 12 that enables the waveplate 10 to form a subwavelength structure, in this example a quarter wave plate (QWP). However, it will be appreciated that the methodology described herein may be applied to any form of waveplate, and in fact to any structure or substrate, where one wishes to create a carefully controlled surface pattern on the structure or substrate involving highly controlled material removal with tilted features.

Figure 2A:
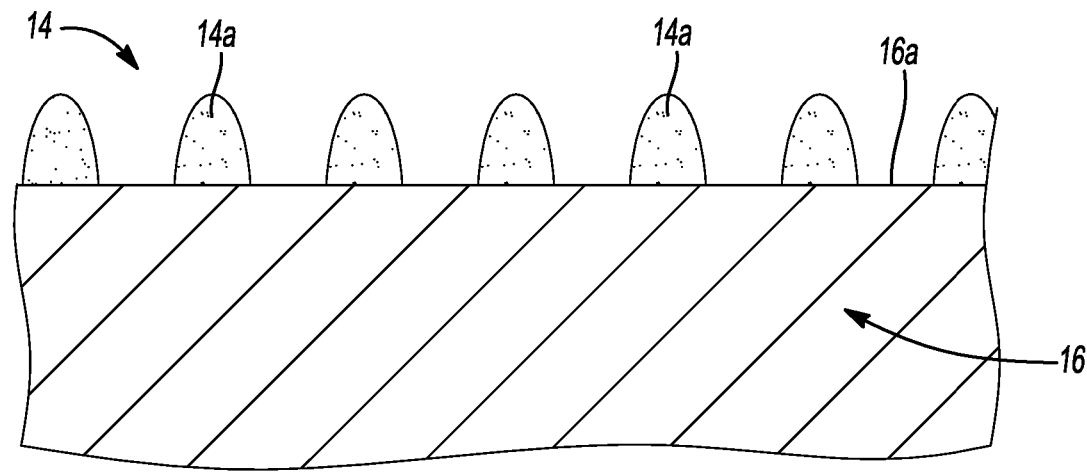
FIG. 2a is a first manufacturing operation in creating the wave plate of FIG. 1 in which an etch mask formed by nano-particles is created on the surface of the substrate.
Figure 2B:
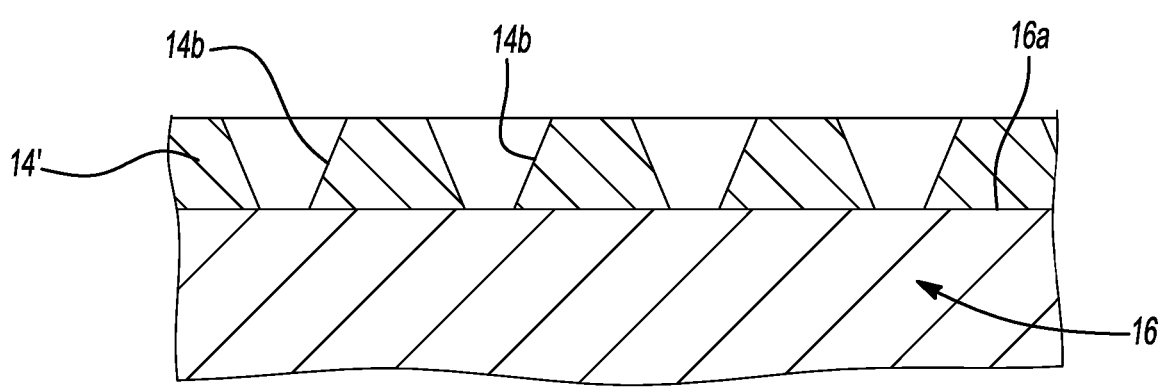
FIG. 2b shows a different embodiment where the etch mask is created from a film on the substrate, in which nano-voids are formed.

To create the birefringent metasurface 12, reference is made to FIG. 2a. Initially, an etch mask 14 is formed on a surface 16a of a substrate 16. The etch mask 14, in one embodiment, may be comprised of subwavelength mask nano-particles 14a deposited on the surface 16a. Alternatively, as shown in FIG. 2b, nano-voids 14b may be formed in a material layer (e.g., film) 14' placed, deposited or otherwise formed on the surface 16a. However, for the purpose of the following discussion, it will be assumed that nanoparticles 14a are being used to form the etch mask 14.

In one preferred methodology a directional etching method, for example, but not limited to, reactive ion etching ("RIE") or reactive ion beam etching ("RIBE"), may then be used to etch the substrate 16 to form the pattern of angled columnar features 12a that collectively form the birefringent metasurface 12. It will be appreciated, however, that the present system and method is agnostic as to how the nano-particle etch mask 14 is applied/formed on the surface 16a of the substrate 16. For example, the nano-particle etch mask 14 may also be achieved using thermal annealing (dewetting) of a thin film, or alternatively by other well known methods such as spin/dip coating.

To obtain a QWP the effective index difference of the product of the two axis index difference ($\Delta n$) times the effective thickness of the modified layer (L) should be a quarter of a wave: $L \cdot \Delta n = \lambda/4$.

Figure 3A:
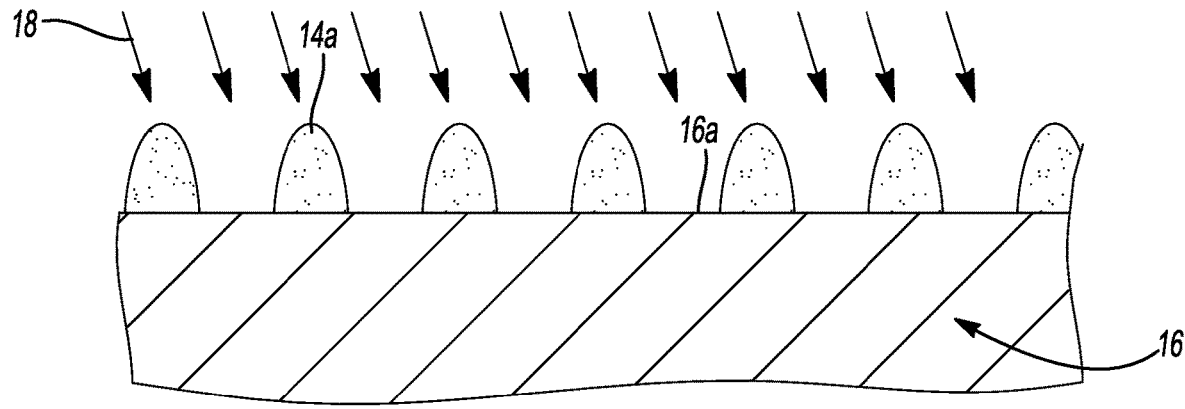
FIG. 3a is side cross sectional view of the substrate of FIG. 2a with arrows indicating an angle at which ions are projected onto the surface during a material removal process to etch the surface of the substrate.
Figure 3B:
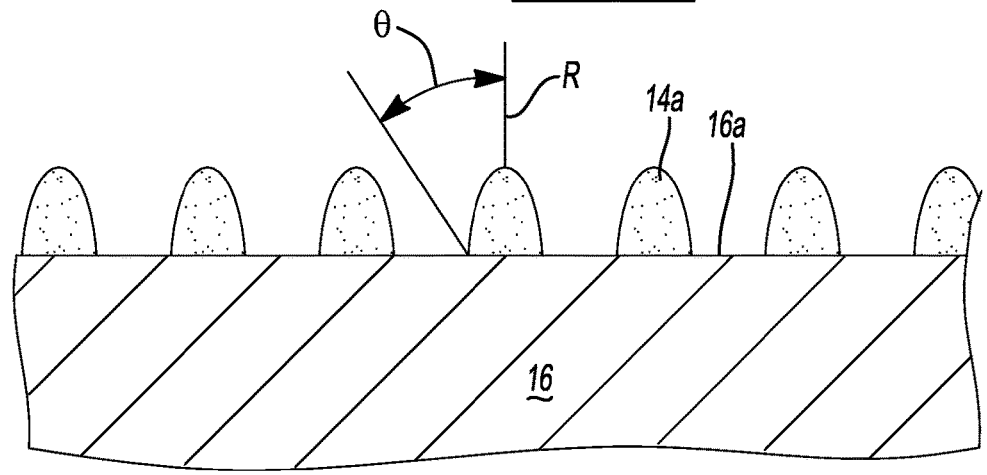
FIG. 3b shows the substrate of FIG. 3a and further illustrates an angle at which the ions are impinging the outer surface of the substrate to etch the outer surface and create the angled, columnar projections which form the birefringent metasurface shown in FIG. 1.
Figure 4:
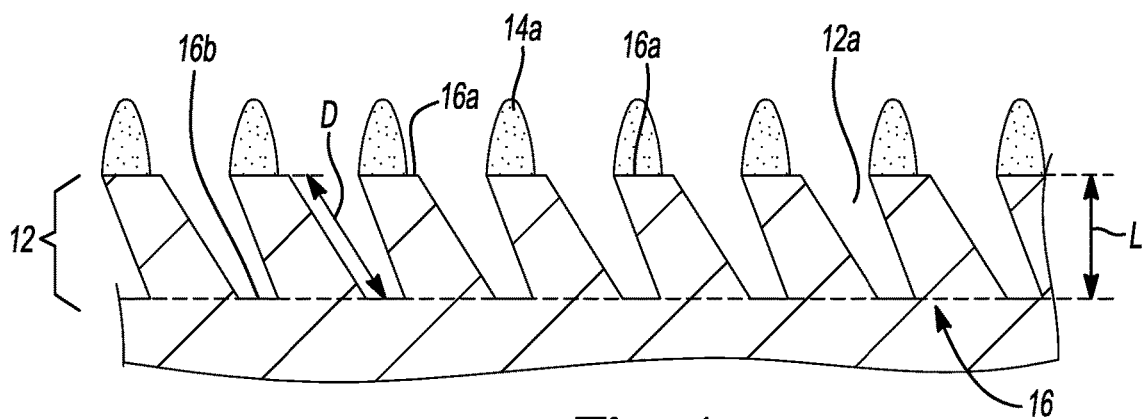
FIG. 4 shows the columnar projections created in a surface portion of the substrate after the etching operation is completed.

Referring to FIGS. 3a-3c, a suitable etching operation, for example RIE or RIBE as mentioned above, may be used to etch the surface 16a to form the pattern of columnar projections 12a that make up the birefringent metasurface 12. For example, FIG. 3a shows arrows 18 to indicate one example of the angle $\theta$ of the trajectory of the reactive ions impinging onto the surface 16a of the substrate 16. As shown in FIG. 3b, the angle $\theta$ of the columnar projections 12a is an angle that is non-parallel to a reference plane "R", where the reference plane R extends normal to the surface 16a. FIG. 4 illustrates a plurality of the columnar projections 12a formed in the substrate 16 at the angle $\theta$, which collectively form the birefringent metasurface 12. The tops of the columnar projections 12a represent what is left of the upper surface 16a, and a new upper surface 16b is formed around a base of each of the columnar projections 12a. Since the columnar projections 12a are angled relative to the outer surface 16a, a depth "L" of each columnar projection 12a will be understood as meaning the overall depth (i.e., or height) of the columnar projection, that being the distance that the columnar projection 12a extends down from its upper end (upper surface 16a) to the new upper surface portion 16b (normal to the outer surface 16a), which will be slightly less than the linear length of the columnar projection 12a ("D"). It will also be noted that the ions performing the etching converge slightly as they extend into the substrate 16, which is a known phenomenon when using reactive ion etching, and which results in the columnar projections 12a being formed such that each has a slightly outwardly tapering shape as they reach the new upper surface portion 16b (FIG. 1). The depth L of each of the columnar projections 12a, in one example, may be about 1 µm.

GLAD waveplates with Δn of up to 0.25 have been previously created with oxide materials. Using this Δn value typically requires roughly about L=1.0λ depth layer to obtain a QWP. The deposition angle, θ, for the above-mentioned GLAD waveplate was between about 60° and 75°. The deposition angle range gives a cos θ value of 0.5-0.25, and therefore, with this estimation, a required etch length (D) of 2-4λ. At the typical λ=351 nm for a final optics assembly in high power lasers, this means etched columnar recesses 12a which, in this specific example, will have a length of roughly about 1 µm. In applying this understanding to the present disclosure, one will appreciate that the exact angle θ will depend in part of the thickness of the substrate 16, and θ may represent an angle from roughly about 30-60 degrees, and more preferably about 40 degrees to roughly about 50 degrees, and still more preferably an angle approximately between about 60 degrees to 75 degrees. As noted above, these angle values will change depending on the thickness of the substrate 16 that one is working with, and possibly other factors as well.

Figure 1A:
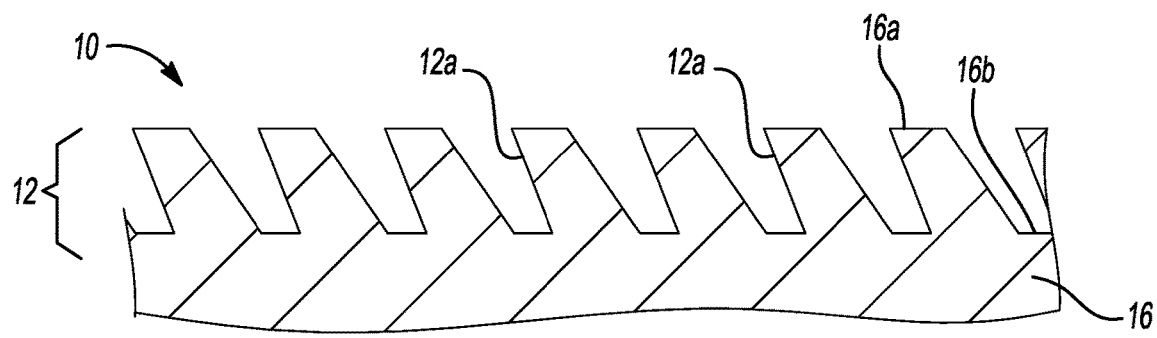
FIG. 1a is a cross-sectional view through the birefringent waveplate taken in accordance with section line 1a-1a in FIG. 1.
Figure 1B:
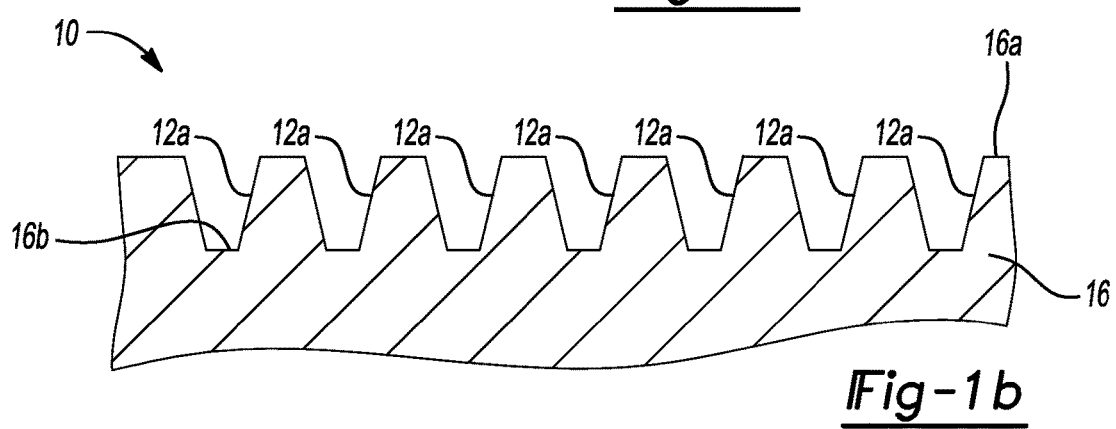

FIG. 1 illustrates the waveplate 10 after the etch mask 14 has been completely removed, leaving only the substrate 16 with the birefringent metasurface 12, formed by the angled, columnar projections 12a, projecting from the new upper surface 16b of the substrate 16. FIGS. 1a and 1b show the columnar projections 12a from two different views rotated 90 degrees from one another.

Figure 1C:
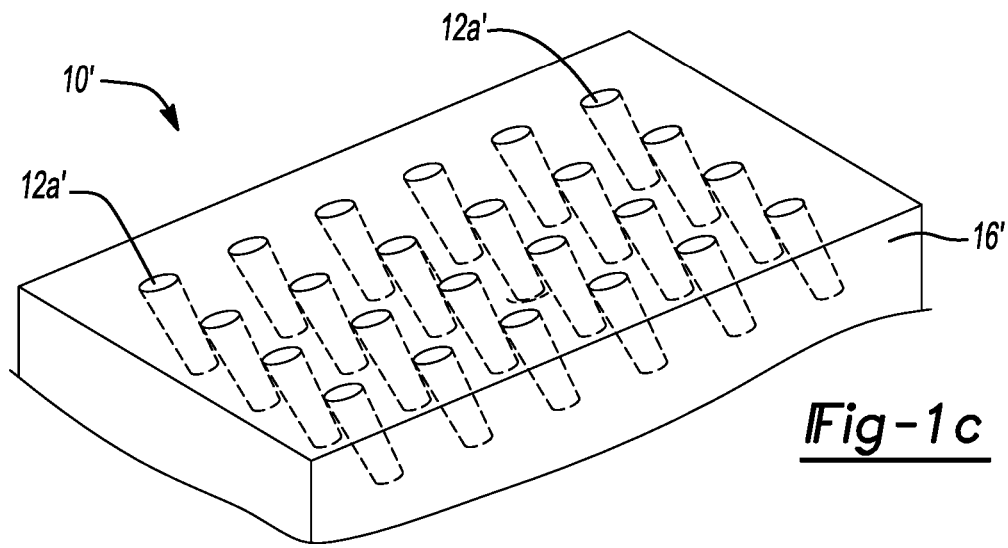
FIG. 1c is a plan view of a birefringent waveplate in accordance with another embodiment of the present disclosure, where the birefringent waveplate includes angled, columnar recesses formed in the substrate material, and which extend at least partially into the thickness of a substrate material of the waveplate, and which was created by using a nano-voids mask.

FIG. 1c illustrates a birefringent waveplate 10' in accordance with another embodiment of the present disclosure which may be formed using the nano-voids 14b of the nano-voids mask 14' of FIG. 2b. In this example the columnar features form a pattern of angled, columnar recesses 12a' in the substrate 16', rather than the angled columnar projections 12a.

Figure 5:
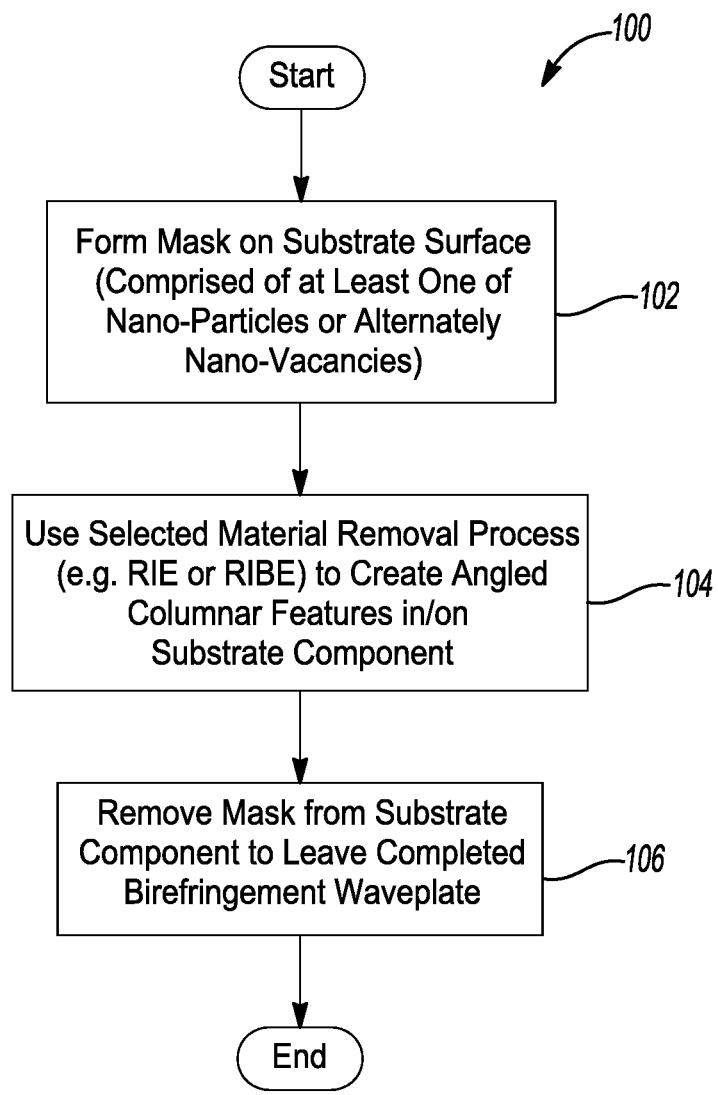
FIG. 5 is a high level flowchart setting forth various operations that may be performed in creating the waveplate of FIG. 1.

FIG. 5 is a flowchart 100 illustrating one example of major operations which may be performed in creating the quarter waveplate 10. Initially at operation 102 the etch mask 14 is formed on the upper surface of the substrate 16. At operation 104 the selected material removal process (e.g., RIE, RIBE, etc.) may be used to removal selected material portions from the substrate 16 to create the columnar projections 12a which collectively form the birefringent metastructure 12. At operation 106 the nano-particles 14a forming the etch mask 14 may then be removed from the outer surface 16a of the substrate 16 to leave the finished quarter waveplate 10. Removal of the nano-particles 14a forming the etch mask 14 will be material dependent, as one example, via a wet process selective etchant.

A typical etching selectivity aspect ratio between mask metal nano-particles 14a and the etched substrate 16 material (e.g., fused silica glass) is between about 1:5 and 1:50, and could be higher depending on the material system and the process. By "etching selectivity aspect ratio" it is meant the ratio of the rate at which the mask and the substrate are being etched away. For example, for a 1:15 etch ratio, a D~3λ channel length requires at least 0.2λ nano-particle 14a thickness, and about the same nano-particle diameter (or less), which is within the parameter space for mask fabrication methods, such as thin metal film dewetting.

A few methods to address cases where a larger retardation layer thickness than the resulting retardation layer thickness L is required (for example, if the etch ratio of the mask/substrate sets a limit), may be summarized as follows. One method is to split the retardation between several independent surfaces. The principal axis of each independent surface should then be aligned, so the retardation layer formed on two or more plates may be easier to manufacture, and then the alignment of the plates may be performed by a suitable calibration procedure. However, a more robust solution, at the system level, may be to have the retardation layer formed on two surfaces of the same element. This may be accomplished by splitting a retardation layer into two (e.g., split a QWP into two ⅛ wave plates) although the principal axis would need to be aligned, which creates an additional complexity that would need to be addressed.

Another option is simply having less than the target λ/4 retardation. This will still translate linear polarization of an optical beam to elliptical polarization, however, it is expected that this construction will lead to an increased LIDT (i.e., a higher damage threshold).

Still another option is using a multi-step etching method. For example, after the mask has eroded by etching, additional deposition of mask will build mainly at the non-etched regions. This is assuming that that the deposition height of the deposited material is substantially smaller than the columnar projection 12a diameter formed between portions of deposited material, so as to not block the deposition of additional material, and since the columnar projections are tilted at an angle relative to the vertical, and the deposition is at normal incidence (or could be further optimized at close to a normal angle opposing the etching direction). After each additional deposition of mask material, further angled etching is enabled.

One example for a potential mask formation method is forming nano-particles with controlled size by depositing energy to thin metal (i.e., thermal annealing and dewetting of thin films). Another method may involve nano-particle self-assembly methods (e.g., using block co-polymer construction). However, as noted above, the present disclosure is agnostic as to how the etch mask 14 is formed, and therefore not limited to any one specific way in which to form the etch mask.

The ability to spatially control the distribution of the mask nano-particles 14a, as was previously shown using laser-induced local heating by spatially patterned laser-raster scan, enables one to spatially pattern the wave retardation, which is advantageous for other methods extending beyond the laser damage resistivity. Controlling the spatial patterning of the mask nano-particles 14 can also be used to reduce the focal spot contrast via polarization smoothing.

It will also be appreciated that sub-wavelength structuring of the waveplate 10 affects not only the index difference between the two principal polarizations, but also their refractive index value. Therefore, with proper design, the design of the waveplate 10 layer may also be used to reduce the reflection from the interface.

The present disclosure thus presents a waveplate 10 and a method for forming the waveplate. The method effectively patterns a portion of a layer of a substrate with a metasurface that has a designed birefringence feature. The layer is a result of angled directional etching through a nano-particle mask or through a mask having nano-voids, which enables one to create either a pattern of the angled, columnar projections 12a or the angled, columnar recesses 12a'. In either case, the resulting meta-surface is monolithic with the substrate and a result of the etching process, and has a relatively high laser-induced damage resistivity and structural stability with respect to other previously utilized methods based on material deposition. The birefringence of the metasurface layer results from the geometry of the metasurface, and thus applies also to non-birefringent substrates. The use of previously proposed methods that spatially control the nano-particle mask characteristics, combined with the present method, is expected to enable spatial control of birefringence of a substrate material. The present method allows for simultaneously tailoring the refractive index of the meta-surface layer as well as its birefringence, thus enabling the combination of desired anti-reflective and birefringence properties to the resulting meta-surface layer. These factors are highly important considerations for optics being used with high power lasers.

While the angled columnar features 12a and the angled columnar recesses 12a' have been illustrated as being arranged in a uniform, grid-like pattern, it will be appreciated that any arrangement or pattern (uniform or non-uniform) of the columnar projections or columnar recesses may be formed using the teachings of the present disclosure to meet a specific optical application. Accordingly, the present disclosure is not limited to only creating uniform patterns of angled columnar features.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A waveplate comprising:
   a substrate forming an optic;
   the substrate including an integral portion forming a plurality of angled columnar features on an exposed surface thereof, the plurality of angled columnar features forming a metasurface that extends partially into a thickness of the substrate;
   each of the angled columnar features having a tapering wall that forms a non-uniform cross-sectional area over a length thereof;
   the plurality of angled columnar features further being aligned parallel with a directional plane formed non-parallel to a reference plane, the reference plane being normal to a surface of the substrate, and such that the tapering wall of each said angled columnar feature is non-symmetrical along a first longitudinal axis of the substrate, and symmetrical along a second axis extending orthogonal to the first longitudinal axis; and
   the metasurface forming a birefringent metasurface.

2. The waveplate of claim 1, wherein the waveplate comprises a quarter waveplate.

3. The waveplate of claim 2, wherein:
   the metasurface forms a retardation layer;
   a two axis index difference is defined by $\Delta n$; and
   a thickness "L" of the retardation layer is defined by:

$$L=\lambda/(4\Delta n).$$

4. The waveplate of claim 1, wherein the waveplate is comprised of fused silica glass.

5. The waveplate of claim 1, wherein the plurality of angled columnar features each extend at an angle $\theta$ of between 60° and 75° relative to the reference plane.

6. The waveplate of claim 1, wherein the plurality of angled columnar features each extend at an angle θ of between about 50° and 60° relative to the reference plane.

7. The waveplate of claim 1, wherein the plurality of angled columnar features each extend at an angle θ of about 40° relative to the reference plane.

8. The waveplate of claim 1, wherein the plurality of angled columnar features each have a length of at least 2λ, where λ is a wavelength of an optical signal passing through the waveplate.

9. The waveplate of claim 8, wherein the plurality of angled columnar features each have a length of from 2λ to 4λ, where λ is a wavelength of an optical signal passing through the waveplate.

10. The waveplate of claim 1, wherein the plurality of angled columnar features each have a length of about 1 μm.

11. The waveplate of claim 1, wherein the plurality of angled columnar features each have a length of about 1.5λ, where λ is a wavelength of an optical signal passing through the waveplate.

12. The waveplate of claim 1, wherein the plurality of angled columnar features comprise a plurality of angled columnar projections forming an integral portion of the substrate.

13. The waveplate of claim 1, wherein the plurality of angled columnar features comprise a plurality of angled columnar recesses forming an integral portion of the substrate.

14. A waveplate for receiving an optical signal, the waveplate comprising:
a substrate forming an optic;
the substrate including an integral portion forming a metasurface formed on an exposed surface thereof, and extending partially into a thickness of the substrate, the metasurface including a plurality of angled columnar features formed using a portion of the substrate, the angled columnar features being in a generally uniform grid-like pattern and each having a length of between 1.5λ and 4λ, where λ is a wavelength of the optical signal passing through the waveplate;
each of the angled columnar features having a tapering wall that forms a non-uniform cross-sectional area over a length thereof;
the plurality of angled columnar features further being aligned parallel with a directional plane defined by an angle θ, where θ is between 40° and 75° relative to a reference plane, the reference plane being normal to a surface of the substrate;
the tapering wall of each said angled columnar feature further being non-symmetrical along a first longitudinal axis of the substrate, and symmetrical along a second axis extending orthogonal to the first longitudinal axis; and
the metasurface forming a birefringent metasurface.

15. The waveplate of claim 14, wherein the angled columnar features comprise at least one of angled columnar projections or angled columnar recesses, which form an integral portion of the substrate.

16. A method for forming a birefringent waveplate, the method comprising:
providing a substrate;
creating a mask on an outer surface of the substrate; and
using a material removal process, together with the mask, to remove select material portions from the substrate to form a plurality of angled columnar features which collectively extend partially into a thickness of the substrate, and collectively form a birefringent metasurface using a portion of the substrate, each of the angled columnar features further having a tapering wall that forms a non-uniform cross-sectional area over a length thereof, and further using the material removal process to form each said angled columnar feature such that each said tapering wall is non-symmetrical along a first longitudinal axis of the substrate, and symmetrical along a second axis extending orthogonal to the first longitudinal axis; and
the birefringent metasurface forming an integral portion of the substrate.

17. The method of claim 16, wherein removing select material portions from the substrate to form the angled columnar features comprises removing select material portions to form a plurality of angled columnar projections which are integral with the substrate.

18. The method of claim 16, wherein removing select material portions from the substrate to form the angled columnar features comprises removing select material portions to form a plurality of columnar angled recesses within a portion of the substrate.

19. The method of claim 16, wherein removing the select material portions further comprises creating each said one of the plurality of angled columnar features with a length of between 1.5λ and 4λ, where λ is a wavelength of an optical signal passing through the waveplate.

20. The method of claim 16, wherein using a material removal process comprises using one of a reactive ion etching (RIE) process or a reactive ion beam etching (RIBE) process.

21. The method of claim 16, wherein creating a mask comprises depositing nano-particles on the outer surface of the substrate to impart to the mask a wavelength shorter than a wavelength λ of an optical signal passing through the waveplate.

22. The method of claim 16, wherein creating a mask comprises forming a mask layer of material on the outer surface of the substrate and creating nano-voids in the mask layer of material.

* * * * *